US010365724B2

(12) United States Patent
Chou

(10) Patent No.: US 10,365,724 B2
(45) Date of Patent: Jul. 30, 2019

(54) KEYBOARD DEVICE AND MOUSE CORD HOLDER THEREOF

(71) Applicant: Hades-Gaming Corporation, New Taipei (TW)

(72) Inventor: Hung-Jen Chou, New Taipei (TW)

(73) Assignee: HADES-GAMING CORPORATION, New Taipei (TW)

( * ) Notice: Subject to any disclaimer, the term of this patent is extended or adjusted under 35 U.S.C. 154(b) by 393 days.

(21) Appl. No.: 15/379,081

(22) Filed: Dec. 14, 2016

(65) Prior Publication Data

US 2018/0052525 A1 Feb. 22, 2018

(30) Foreign Application Priority Data

Aug. 16, 2016 (TW) ............................. 105126151 A

(51) Int. Cl.
*G06F 3/039* (2013.01)
*G06F 3/02* (2006.01)

(52) U.S. Cl.
CPC ............ *G06F 3/0219* (2013.01); *G06F 3/039* (2013.01)

(58) Field of Classification Search
USPC ....................... 248/346.01, 74.1; 361/679.08
See application file for complete search history.

(56) References Cited

U.S. PATENT DOCUMENTS 5,323,992 A * 6/1994 Sifers .................. A61M 5/1418 24/129 R
5,433,407 A * 7/1995 Rice ................... A47B 21/0371 248/118.1
5,593,128 A * 1/1997 Odom .................. A47B 23/002 248/346.01
5,636,822 A * 6/1997 Hendershot ........... G06F 3/0395 248/346.01
5,723,821 A * 3/1998 Klinger ................... G06F 3/039 174/135
5,844,775 A * 12/1998 Lundberg ................ G06F 3/039 361/679.08
6,299,111 B1 * 10/2001 Brothers ................ H02G 11/00 248/473
6,431,500 B1 * 8/2002 Jacobs ...................... F16L 3/13 24/129 R
7,090,169 B2 * 8/2006 Swanson ................ B64D 17/24 244/142
8,695,170 B2 * 4/2014 Honeycutt ........... A44C 15/003 24/3.1

(Continued)

*Primary Examiner* — Monica E Millner

(74) *Attorney, Agent, or Firm* — Chun-Ming Shih; HDLS IPR Services

(57) ABSTRACT

A keyboard device and a mouse cord holder thereof for using in a mouse cord (101). The mouse cord holder (10) includes a base (1), a cord guiding frame (2) and a magnetic assembly (3). The base (1) has a bottom surface (11). The cord guiding frame (2) is connected to the base (1) and is arranged at an acute angle (θ) with respect to the bottom surface (11). The magnetic assembly (3) includes a first magnetic element (31) and a second magnetic element (32), the first magnetic element (31) is fixed at one end of the cord guiding frame (2) away from the base (1), and the second magnetic element (32) receives and fixes the mouse cord (101). The first magnetic element (31) and the second magnetic element (32) are magnetically attached to each other or are separated from each other.

17 Claims, 9 Drawing Sheets

(56) References Cited

U.S. PATENT DOCUMENTS

| | | | | |
|---|---|---|---|---|
| 8,931,743 | B2 * | 1/2015 | Stango, Jr. | H02G 3/32 248/74.1 |
| 9,124,053 | B2 * | 9/2015 | Metras | H01R 13/60 |
| 2009/0320247 | A1 * | 12/2009 | Honeycutt | A41D 1/002 24/122.6 |

* cited by examiner

KEYBOARD DEVICE AND MOUSE CORD HOLDER THEREOF

TECHNICAL FIELD

The present invention relates to a computer peripheral and, in particular, to a keyboard device and a mouse cord holder thereof.

BACKGROUND

Game players need to play computer games smoothly and quickly, so quick movement of a mouse is required for winning the game and beating an opponent. However, the mouse is typically placed on a desktop with its mouse cord hanging down over the edge of the desktop, so the weight of the mouse cord will affect movement of the mouse when the mouse move in a direction different from the hanging down direction of the mouse cord. This drag effect tends to inhibit complete freedom of use of the mouse.

In solution, a mouse cord holder has been launched in the market, which mainly includes a base and a cord guiding frame. The cord guiding frame is fixed to the base and is inclined upwardly at an angle of 45 degrees with respect to the base. An end of the cord guiding frame has a retaining element or a clamping element. The mouse cord is limited/retained by the retaining element or is clamped by the clamping element, so that one section of the mouse cord of the mouse is suspended by the cord guiding frame to prevent the weight of the mouse cord from affecting movement of the mouse.

However, the above-mentioned mouse cord holder has the following shortcomings. Since the mouse cord holder utilizes the retaining element or the clamping element to limit or clamp the mouse cord, the mouse cord holder easily tips over when the mouse moves too far away or the mouse is pulled too hard, resulting in operation errors or interruptions while playing games or operating a computer.

Accordingly, it is the aim of the present invention to solve the above-mentioned problems, on the basis of which the present invention is accomplished.

SUMMARY

It is an object of the present invention to provide a keyboard device and a mouse cord holder thereof. When the first magnetic element and the second magnetic element are magnetically attracted to each other, one section of a mouse cord of a mouse can be suspended, and therefore the weight of the mouse cord does not affect movement of the mouse while the mouse is moving. When the mouse moves too far away or is pulled too hard, the first magnetic element is separated from the second magnetic element, so that tipping over of the mouse cord holder is prevented, and movement of the mouse is not inhibited by the cord guiding frame, and thereby a user can operate the mouse and a computer smoothly.

Accordingly, the present invention provides a mouse cord holder for a mouse cord, comprising: a base having a bottom surface; a cord guiding frame, the cord guiding frame being connected to the base and being arranged at an acute angle with respect to the bottom surface; and a magnetic assembly including a first magnetic element and a second magnetic element, the first magnetic element being fixed at one end of the cord guiding frame away from the base, the second magnetic element receiving and fixing the mouse cord, wherein the first magnetic element and the second magnetic element are magnetically attached to each other or separated from each other.

Accordingly, the present invention provides a keyboard device for use with a mouse cord, the keyboard device comprising: a keyboard body; and a mouse cord holder connected to the keyboard body. The mouse cord holder comprises: a base including a bottom surface; a cord guiding frame connected to the base and arranged at an acute angle with respect to the bottom surface; and a magnetic assembly including a first magnetic element and a second magnetic element, the first magnetic element being fixed at one end of the cord guiding frame away from the base, the second magnetic element receiving and fixing the mouse cord, the first magnetic element and the second magnetic element being magnetically attached to each other or separated from each other.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION

Figure 1:
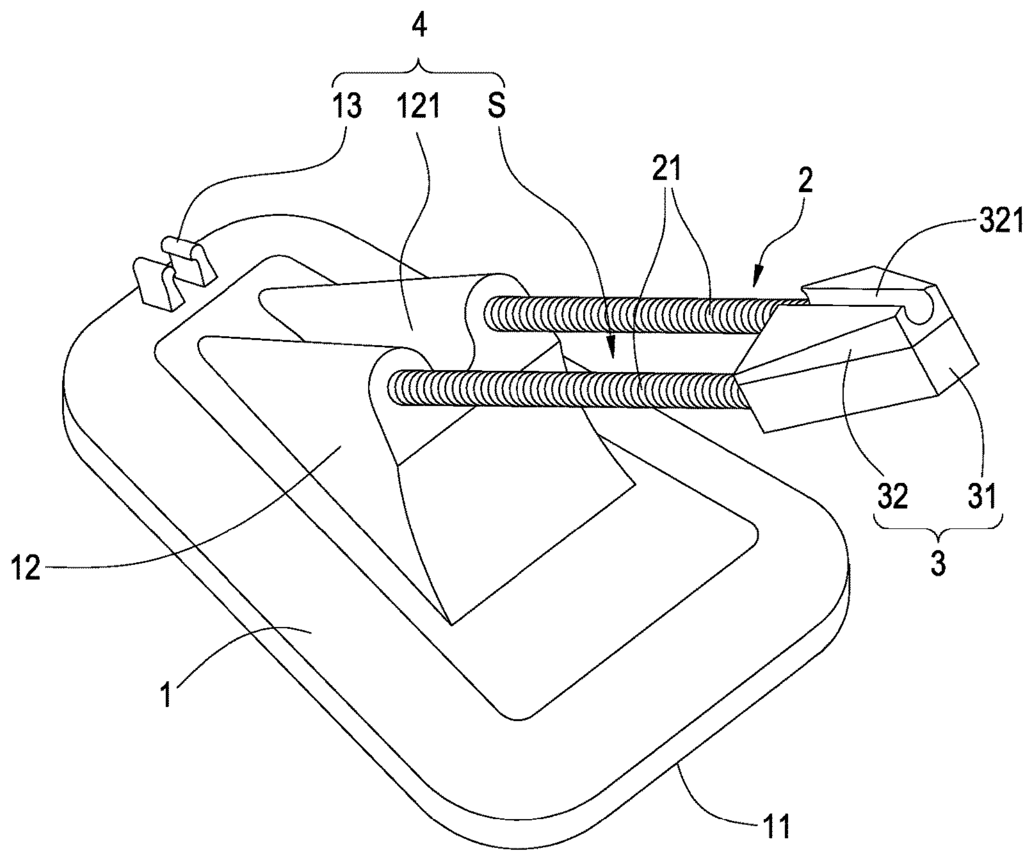
FIG. 1 is a perspective assembled view illustrating a mouse cord holder of the present invention.
Figure 2:
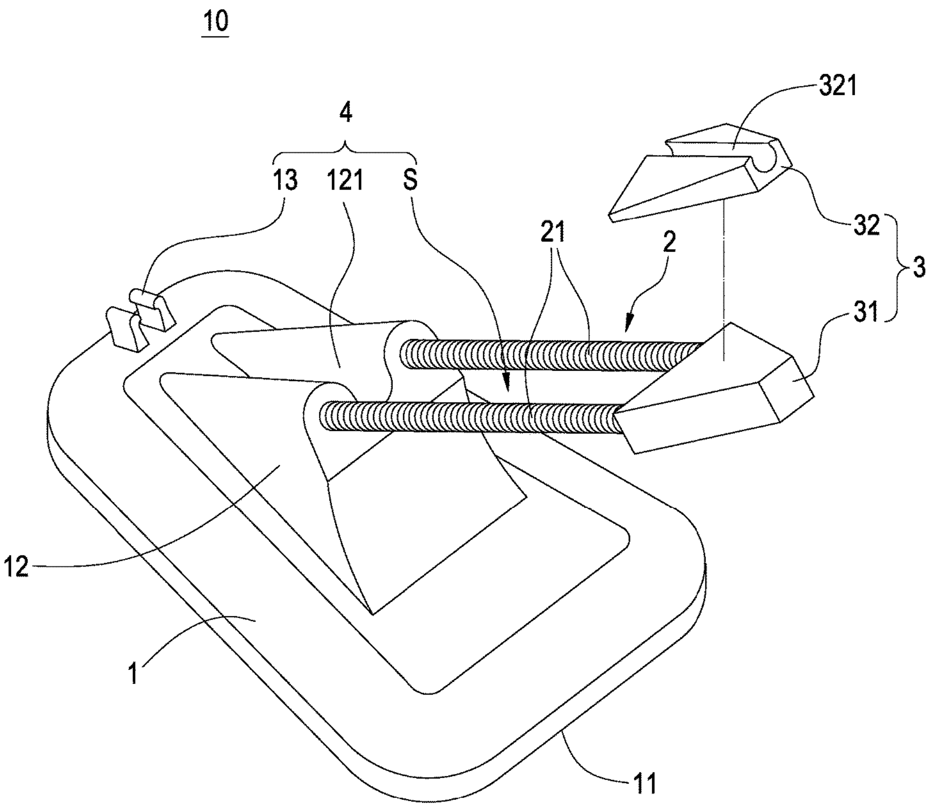
FIG. 2 is a perspective view illustrating the mouse cord holder.
Figure 3:
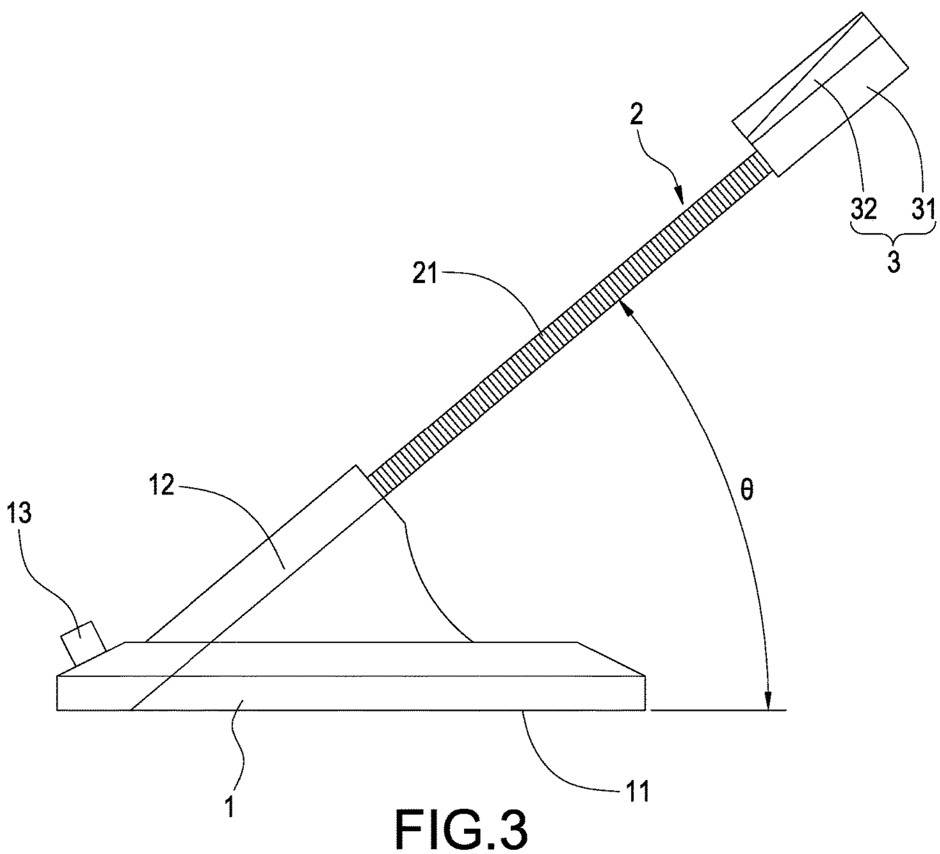
FIG. 3 is a cross-sectional view illustrating the mouse cord holder.

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Referring to FIGS. 1 to 6, the present invention provides a keyboard device and a mouse cord holder for a mouse 100. The mouse 100 includes a mouse cord 101. The mouse cord holder 10 includes a base 1, a cord guiding frame 2, and a magnetic assembly 3. The keyboard device 20 mainly includes a keyboard body 5 and a mouse cord holder 10.

As shown in FIGS. 1 to 5, the base 1 has a bottom surface 11, a bump 12, and a fastener 13. The bump 12 has a groove 121. In the present embodiment, the bump 12 integrally extends from the base 1, and the base 1 consists of silicone or plastic and encloses a heavy block inside.

As shown in FIGS. 1 to 5, the cord guiding frame 2 is connected between the base 1 and the bottom surface 11 and is arranged at an acute angle θ. The cord guiding frame 2 includes two flexible rods 21, a gap S is formed between the two flexible rods 21, and the groove 121 is disposed between the gap S and the fastener 13. The fastener 13, the groove 121 and the gap S together constitute a cord track 4, and the mouse cord 101 is inserted through the cord track 4.

The two flexible rods 21 are insertedly fixed to the bump 12 of the base 1. The two flexible rods 21 are arranged at an acute angle θ with respect to the bottom surface 11. The acute angle θ is equal to or more than 45 degrees. Each of the flexible rods 21 consists of a flexible element, silicone, a hose, or a spring.

As shown in FIGS. 1 to 5, the magnetic assembly 3 includes a first magnetic element 31 and a second magnetic element 32, the first magnetic element is fixed at one end of the cord guiding frame 2 away from the base 1, the second magnetic element 32 receives and fixes the mouse cord 101, the first magnetic element 31 and the second magnetic element 32 are magnetically attached to each other or separated from each other.

In detail, the first magnetic element 31 is fixed to one end of the two flexible rods 21 away from the base 1, the second magnetic element 32 includes a notch 321, and the second magnetic element 32 receives and fixes the mouse cord 101 by means of the notch 321.

Moreover, one of the first magnetic element 31 and the second magnetic element 32 is a magnet, and the other one of the first magnetic element 31 and the second magnetic element 32 consists of metal containing iron, cobalt, or nickel.

As shown in FIGS. 1 to 5, in the mouse cord holder 10 of the present invention, the base 1 has the bottom surface 11, the cord guiding frame 2 is connected to the base 1 and is arranged at the acute angle θ with respect to the bottom surface 11, the magnetic assembly 3 includes the first magnetic element 31 and the second magnetic element 32, the first magnetic element 31 is fixed at one end of the cord guiding frame 2 away from the base 1, the second magnetic element 32 receives and fixes the mouse cord 101, and the first magnetic element 31 and the second magnetic element 32 are magnetically attached to each other or separated from each other.

Figure 4:
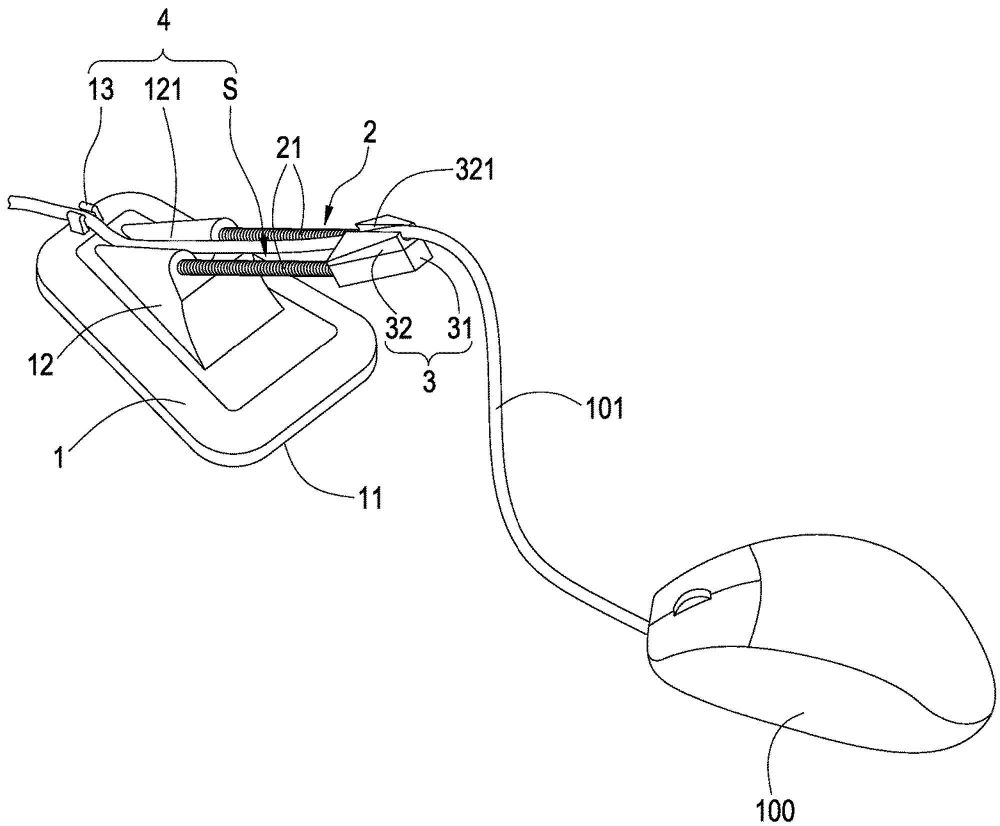
FIG. 4 is a schematic view illustrating the mouse cord holder in use.
Figure 5:
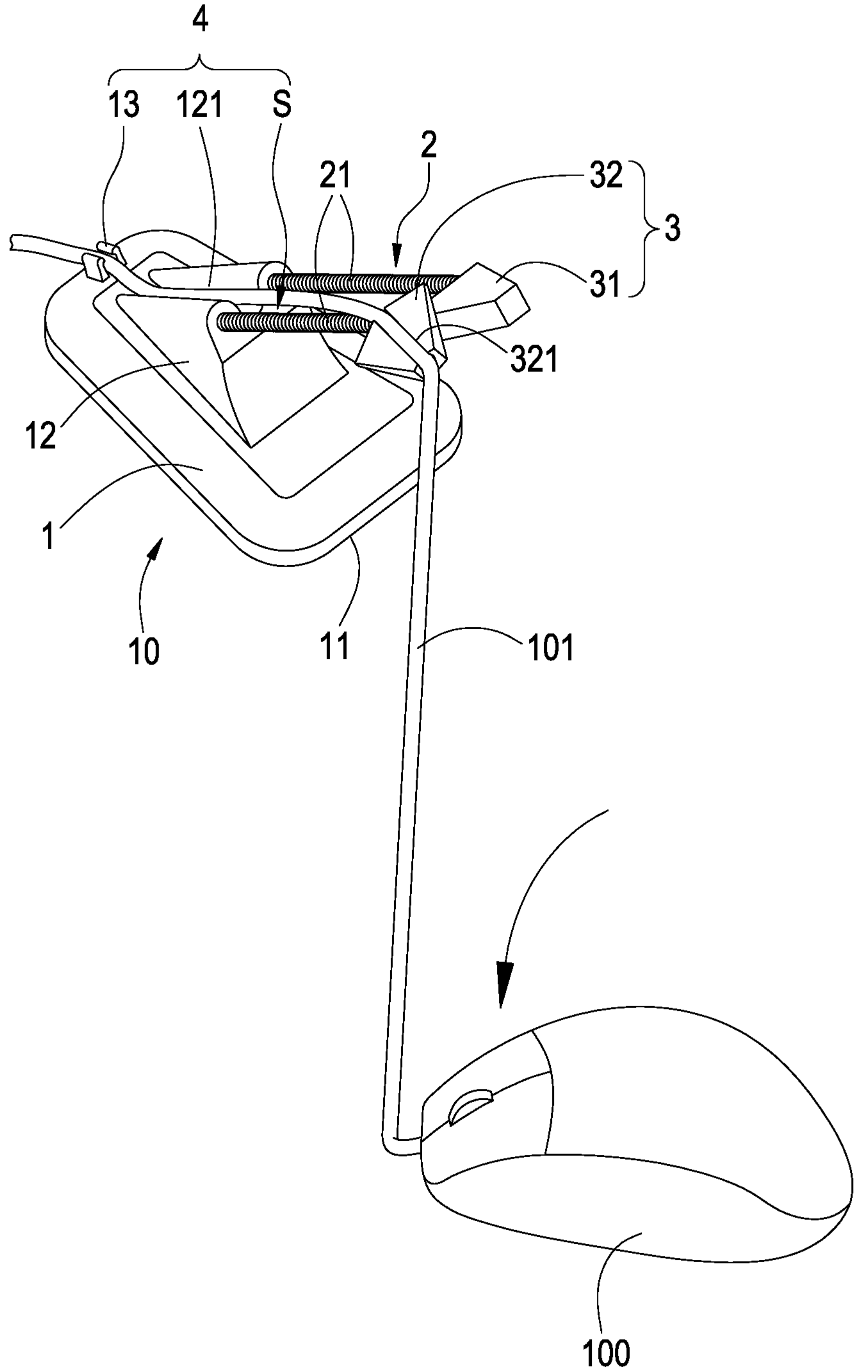
FIG. 5 is another schematic view illustrating the mouse cord holder in use.
Figure 6:
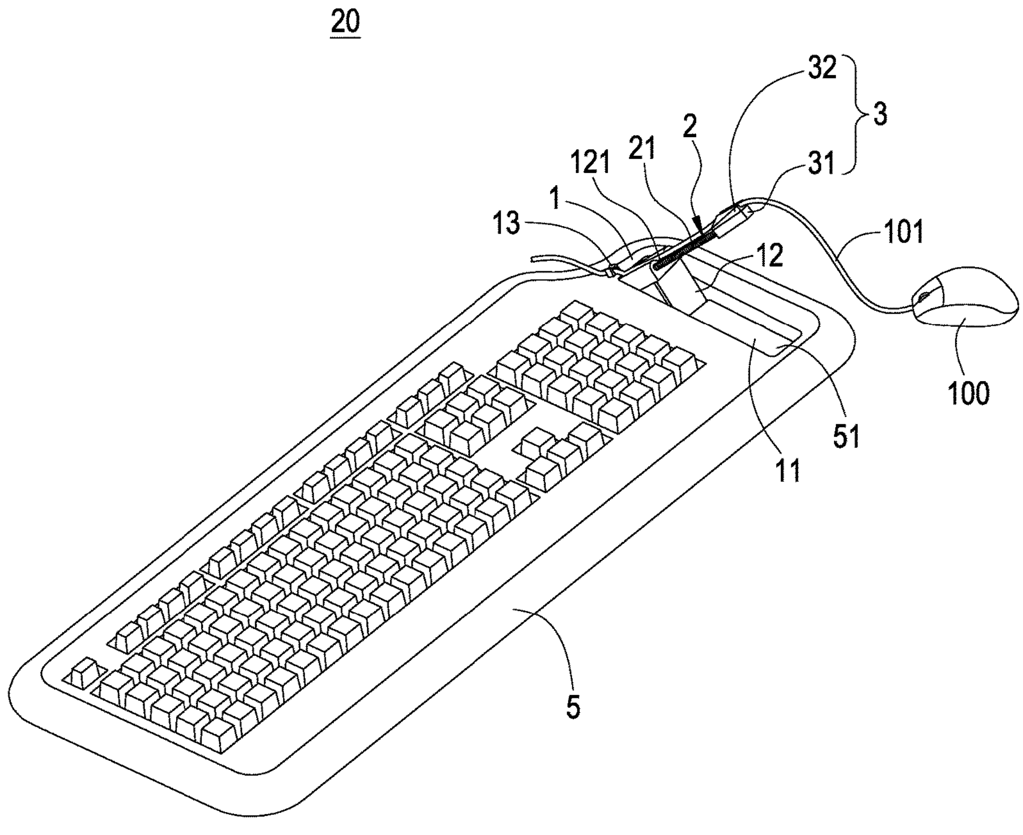
FIG. 6 is a schematic view of the present invention, illustrating a keyboard device in use.

Please refer to FIGS. 4 and 5 illustrating the mouse cord holder 10 in use. The first magnetic element 31 is fixed at one end of the cord guiding frame 2 away from the base 1. The second magnetic element 32 receives and fixes the mouse cord 101, so that the mouse cord 101 is sequentially inserted through the fastener 13, the groove 121 and the gap S. The two flexible rods 21 are arranged at the acute angle θ with respect to the bottom surface 11. It is preferable that the acute angle θ is equal to or more than 45 degrees, so that one section of the mouse cord 101 is suspended by the cord track 4 when the mouse cord 101 is inserted through the cord track 4. As shown in FIG. 4, when the first magnetic element 31 and the second magnetic element 32 are magnetically attached to each other, the mouse cord 101 of the mouse 100 is suspended by the cord guiding frame 2 to thereby prevent the weight of the mouse cord 101 from affecting movement of the mouse 100. As shown in FIG. 5, when the mouse 100 moves too far away or is pulled too hard, the first magnetic element 31 is separated from the second magnetic element 32, so that tipping over of the mouse cord holder 10 is prevented, and movement of the mouse 100 is not hindered by the cord guiding frame 2, and thus the mouse 100 can operate smoothly without being dragged. In other words, the mouse cord holder 10 allows operating the mouse 100 and computers smoothly.

Furthermore, the cord guiding frame 2 includes the two flexible rods 21. Therefore, when the mouse cord 101 moves normally, the flexible rod 21 is slightly offset along a movement direction of the mouse cord 101, and consequently, the mouse cord holder 10 facilitates convenient operations of the mouse 100.

Further, the user can adjust the length of the mouse cord 101 to suit his own taste by adjusting the mouse cord 101 on the second magnetic element 32, rather than on the first magnetic element 31, so as to facilitate more convenient usage of the mouse cord holder 10. As shown in FIGS. 1 to 5, the keyboard device 20 includes the keyboard body 5 and the mouse cord holder 10, and the mouse cord holder 10 is connected to the keyboard body 5.

The keyboard body 5 includes a recess 51, the base 1 and the fastener 13 integrally extend from the keyboard body 5, the bottom surface 11 is formed on a bottom of the recess 51, the bump 12 is separated from the keyboard body 5, and the bump 12 is pivotally connected to the keyboard body 5 and is receivable in the recess 51. Accordingly, the keyboard device 20 facilitates smooth operations of the mouse 100 and the computer by means of the mouse cord holder 10.

Alternatively, the base, the bump 12 and the fastener 13 can be integrally formed with the keyboard body 5, and the bottom surface 11 can be formed on a bottom of the keyboard body 5 for the same functions and effects mentioned above.

Figure 7:
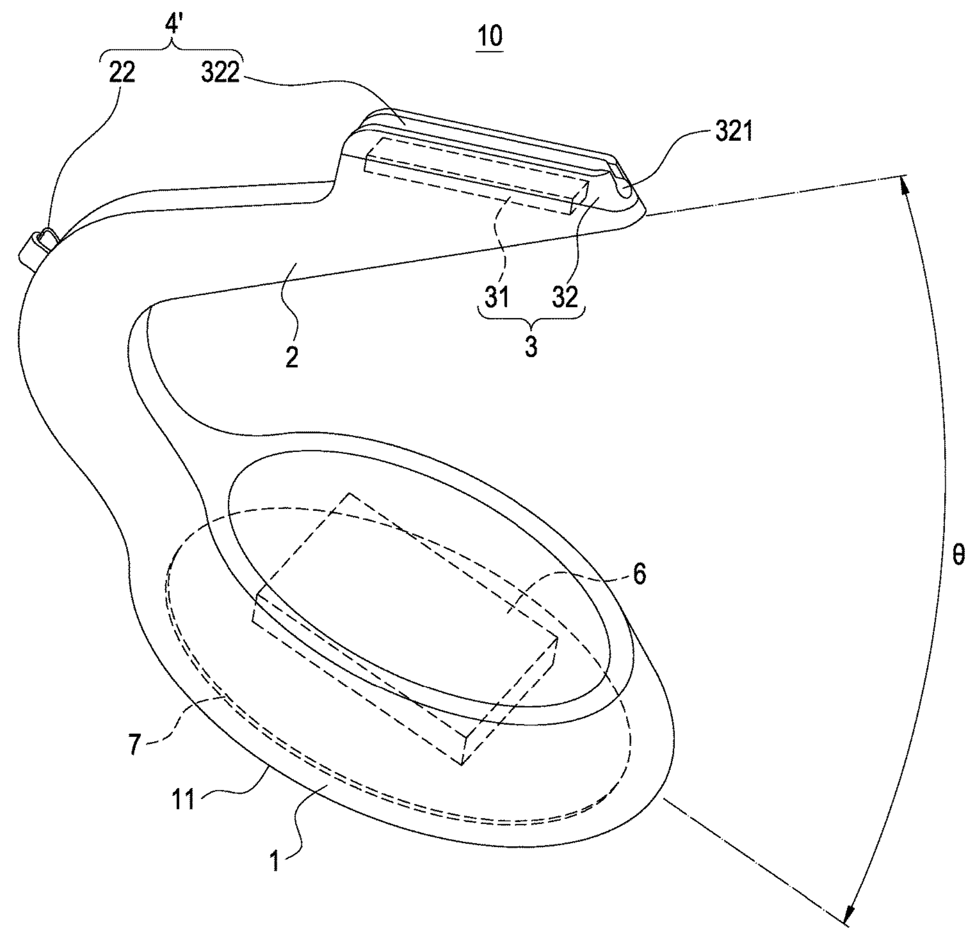
FIG. 7 is a perspective assembled view illustrating the mouse cord holder according to another embodiment of the present invention.
Figure 8:
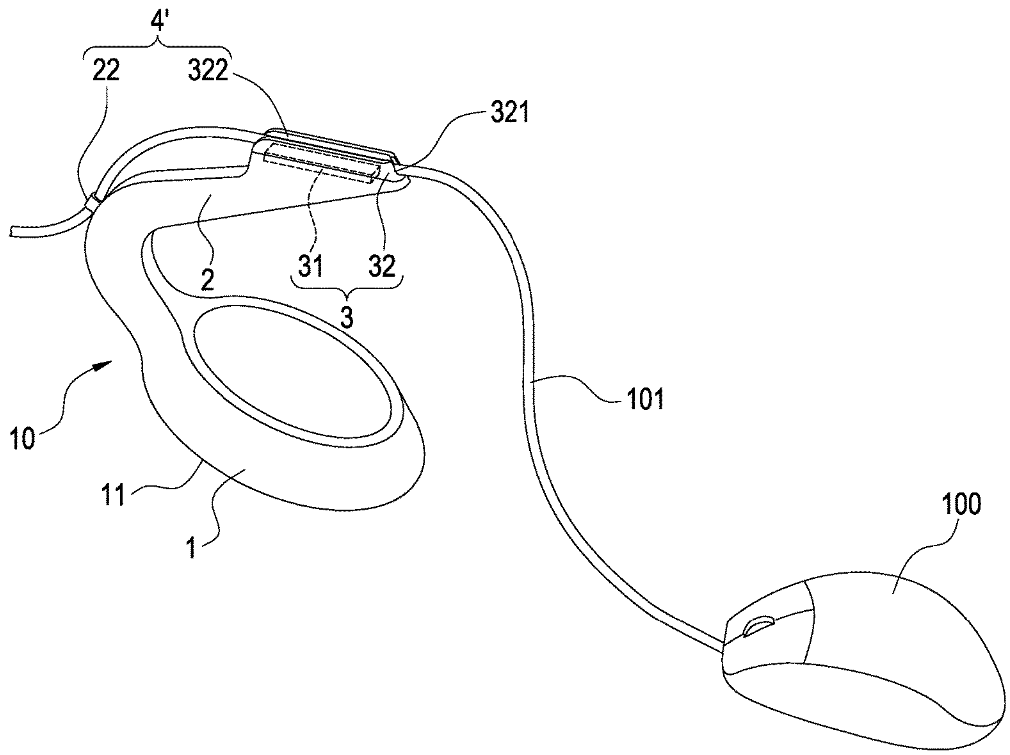
FIG. 8 is a schematic view illustrating the mouse cord holder in use according to the another embodiment of the present invention.
Figure 9:
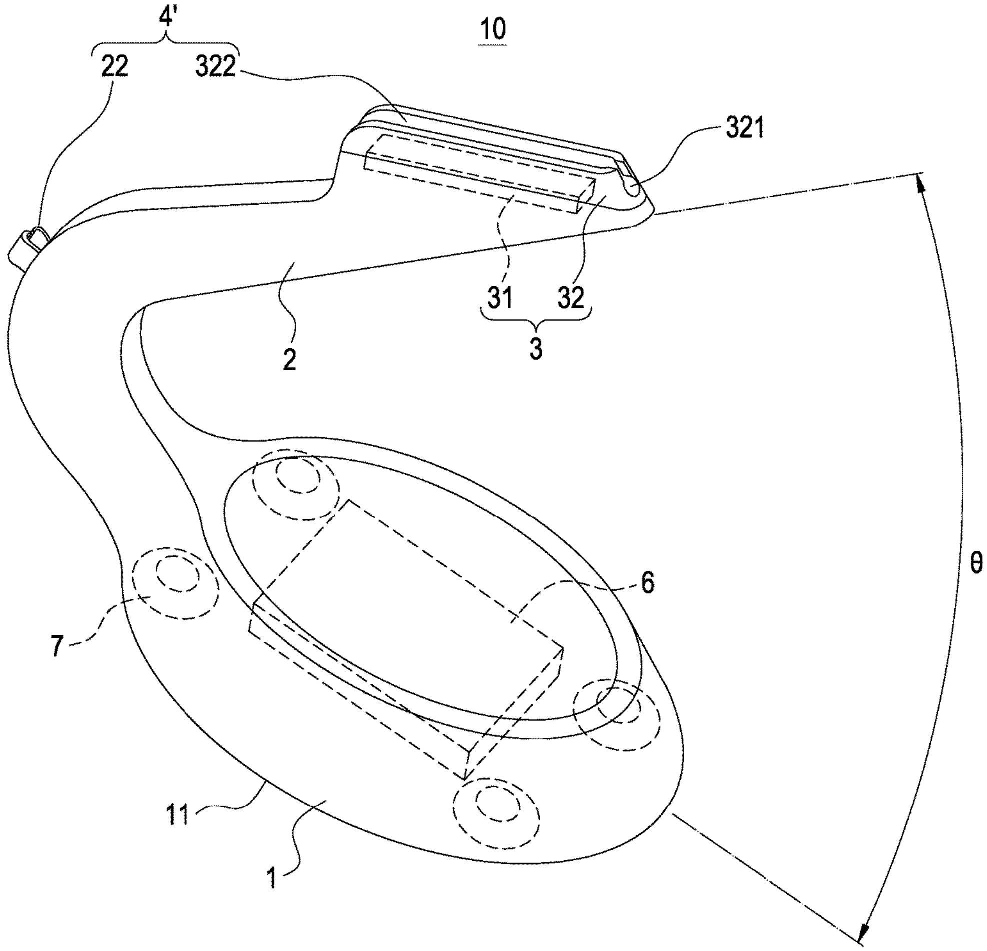
FIG. 9 is a perspective assembled view illustrating the mouse cord holder according to still another embodiment of the present invention.

Please refer to FIGS. 7 to 9, illustrating the mouse cord holder 10 according to another embodiment and still another embodiment of the present invention. The embodiments shown in FIGS. 7 to 9 are similar to the embodiment shown in FIGS. 1 to 5, with the difference that the cord guiding frame 2 integrally extends from one side of the base 1.

In detail, the cord guiding frame 2 integrally extends upwardly from one side of the base 1, a fastening element 22 extends from the cord guiding frame 2, the second magnetic element 32 includes a notch 321 and a trench 322 communicating with each other, the second magnetic element 32 receives and fixes the mouse cord 101 through the notch 321, the fastening element 22 and the trench 322 together constitute a cord track 4', and the mouse cord 101 is inserted through the cord track 4'. Accordingly, the same functions and effects provided by the embodiment of FIGS. 1 to 5 can also be achieved.

Moreover, the mouse cord holder 10 includes a weight block 6, and the weight block 6 is embedded in the base 1 for increasing the weight of the base 1, thus decreasing the possibility of tipping over of the base 1. The weight block 6 is a metal block or a battery. If the base is disposed with a light emitting diode, the battery can supply power to the light emitting diode.

As shown in FIGS. 7 and 9, the mouse cord holder 10 further comprises a connection element 7, the connection element 7 is connected to the bottom surface 11, and the connection element 7 consists of an adhesive or multiple suckers. The connection element 7 is disposed between the bottom surface 1 and a desktop or a flat surface of other object, and the connection element 7 is connected to the bottom surface 1 or the flat surface of other object, so that the base 1 is securely fastened to the desktop or the flat surface of other object, thereby preventing tipping over of the base 1.

Similarly, the base 1 in the embodiment of FIGS. 1 to 5 can also include the weight block 6 embedded inside. The connection element 7 can also be connected to the base 1 in the embodiment of FIGS. 1 to 5, so as to enhance the stability of the base 1 standing on the desktop or the flat surface of other objects.

In summary, the keyboard device and the mouse cord holder thereof are neither disclosed by similar products nor used in public. The present invention also has industrial applicability, novelty and non-obviousness, so the present invention completely complies with the requirements of patentability. Therefore, a request to patent the present invention is filed pursuant to patent law. Examination is kindly requested, and allowance of the present application is solicited to protect the rights of the inventor.

What is claimed is:

1. A mouse cord holder for a mouse cord (101), the mouse cord holder (10) comprising:

a base (1) having a bottom surface (11);

a cord guiding frame (2), the cord guiding frame (2) being connected to the base (1) and being arranged at an acute angle (θ) with respect to the bottom surface (11); and a magnetic assembly (3) including a first magnetic element (31) and a second magnetic element (32), the first magnetic element (31) being fixed at one end of the cord guiding frame (2) away from the base (1), the second magnetic element (32) receiving and fixing the mouse cord (101), the first magnetic element (31) and the second magnetic element (32) being magnetically attached to each other or separated from each other.

2. The mouse cord holder of claim 1, wherein the cord guiding frame (2) includes two flexible rods (21), the two flexible rods (21) are insertedly fixed to the base (1), the two flexible rods (21) are arranged at the acute angle (θ) with respect to the bottom surface (11), the first magnetic element (31) is fixed to one end of the two flexible rods (21) away from the base (1), a gap (S) is formed between the two flexible rods (21), and each of the flexible rods (21) consists of a flexible element, silicone, a hose, or a spring.

3. The mouse cord holder of claim 2, wherein the base (1) includes a bump (12) and a fastener (13), the two flexible rods (21) are insertedly fixed to the bump (12), the bump (12) has a groove (121) disposed between the gap (S) and the fastener (13), the fastener (13), the groove (121) and the gap (S) together constitute a cord track (4), and the mouse cord (101) is inserted through the cord track (4).

4. The mouse cord holder of claim 1, further comprising a weight block (6), the weight block (6) is embedded in the base (1), and the weight block (6) is a metal block or a battery.

5. The mouse cord holder of claim 1, further comprising a connection element (7), the connection element (7) is connected to the bottom surface (11), and the connection element (7) consists of an adhesive or at least one sucker.

6. The mouse cord holder of claim 1, wherein the second magnetic element (32) includes a notch (321), and the second magnetic element (32) receives and fixes the mouse cord (101) by means of the notch (321).

7. The mouse cord holder of claim 1, wherein one of the first magnetic element (31) and the second magnetic element (32) is a magnet, and the other one of the first magnetic element (31) and the second magnetic element (32) consists of metal containing iron, cobalt, or nickel.

8. The mouse cord holder of claim 1, wherein the cord guiding frame (2) integrally extends upwardly from one side of the base (1), a fastening element (22) extends from the cord guiding frame (2), the second magnetic element (32) includes a notch (321) and a trench (322) communicating with each other, the second magnetic element (32) receives and fixes the mouse cord (101) through the notch (321), the fastening element (22) and the trench (322) together constitute a cord track (4'), and the mouse cord (101) is inserted through the cord track (4').

9. A keyboard device for use with a mouse cord (101), the keyboard device comprising:

a keyboard body (5); and a mouse cord holder (10) connected to the keyboard body (5), the mouse cord holder (10) comprising:

a base (1) including a bottom surface (11);

a cord guiding frame (2) connected to the base (1) and arranged at an acute angle (θ) with respect to the bottom surface (11); and a magnetic assembly (3) including a first magnetic element (31) and a second magnetic element (32), the first magnetic element being fixed at one end of the cord guiding frame (2) away from the base (1), the second magnetic element (32) receiving and fixing the mouse cord (101), the first magnetic element (31) and the second magnetic element (32) being magnetically attached to each other or separated from each other.

10. The keyboard device of claim 9, wherein the cord guiding frame (2) includes two flexible rods (21), the two flexible rods (21) are insertedly fixed to the base (1), the two flexible rods (21) are arranged at the acute angle (θ) with respect to the bottom surface (11), the first magnetic element (31) is fixed to one end of the two flexible rods (21) away from the base (1), a gap (S) is formed between the two flexible rods (21), and each of the flexible rods (21) consists of a flexible element, silicone, a hose, or a spring.

11. The keyboard device of claim 10, wherein the base (1) includes a bump (12) and a fastener (13), the two flexible rods (21) are insertedly fixed to the bump (12), the bump (12) has a groove (121) disposed between the gap (S) and the fastener (13), the fastener (13), the groove (121) and the gap (S) together constitute a cord track (4), and the mouse cord (101) is inserted through the cord track (4).

12. The keyboard device of claim 11, wherein the keyboard body (5) includes a recess (51), the base (1) and the fastener (13) integrally extend from the keyboard body (5), the bottom surface (11) is formed on a bottom of the recess (51), the bump (12) is separated from the keyboard body (5), and the bump (12) is pivotally connected to the keyboard body (5) and is receivable in the recess (51).

13. The keyboard device of claim 9, wherein the mouse cord holder (10) includes a weight block (6), the weight block (6) is embedded in the base (1), and the weight block (6) is a metal block or a battery.

14. The keyboard device of claim 9, wherein the mouse cord holder (10) comprises a connection element (7), the connection element (7) is connected to the bottom surface (11), and the connection element (7) consists of an adhesive or at least one sucker.

15. The keyboard device of claim 9, wherein the second magnetic element (32) includes a notch (321), and the second magnetic element (32) fixes the mouse cord (101) by means of the notch (321).

16. The keyboard device of claim 9, wherein one of the first magnetic element (31) and the second magnetic element (32) is a magnet, and the other one of the first magnetic element (31) and the second magnetic element (32) consists of metal containing iron, cobalt, or nickel.

17. The keyboard device of claim 9, the cord guiding frame (2) integrally extends upwardly from one side of the base (1), a fastening element (22) extends from the cord guiding frame (2), the second magnetic element (32) includes a notch (321) and a trench (322) communicating with each other, the second magnetic element (32) receives and fixes the mouse cord (101) through the notch (321), the fastening element (22) and the trench (322) together constitute a cord track (4'), and the mouse cord (101) is inserted through the cord track (4').

* * * * *